S. G. CRANE.
AUTOMATIC WEIGHING SCALE.
APPLICATION FILED MAR. 4, 1915.

1,328,319.

Patented Jan. 20, 1920.
3 SHEETS—SHEET 1.

WITNESSES:
D. C. Walter
Carl Jinke

INVENTOR.
Samuel G. Crane
By George R. Frye
ATTORNEY

S. G. CRANE.
AUTOMATIC WEIGHING SCALE.
APPLICATION FILED MAR. 4, 1915.
1,328,319.
Patented Jan. 20, 1920.
3 SHEETS—SHEET 2.
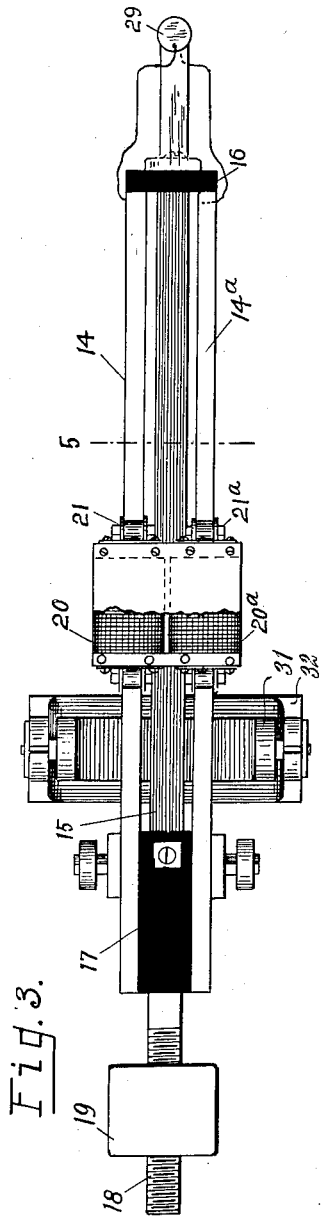
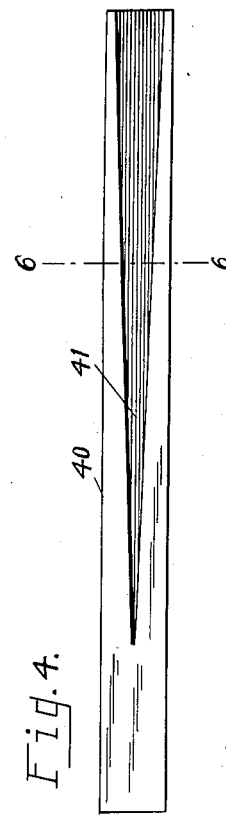
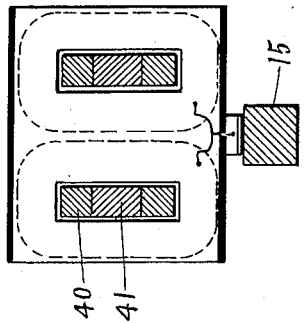
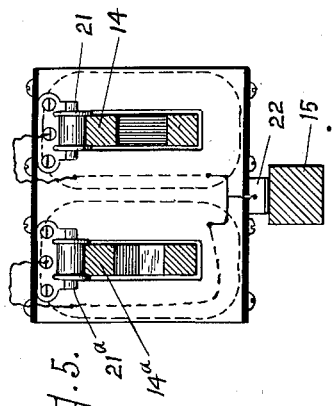
WITNESSES:
D. C. Walter
Carl Jinke
INVENTOR.
Samuel G. Crane
BY George R. Frye
ATTORNEY

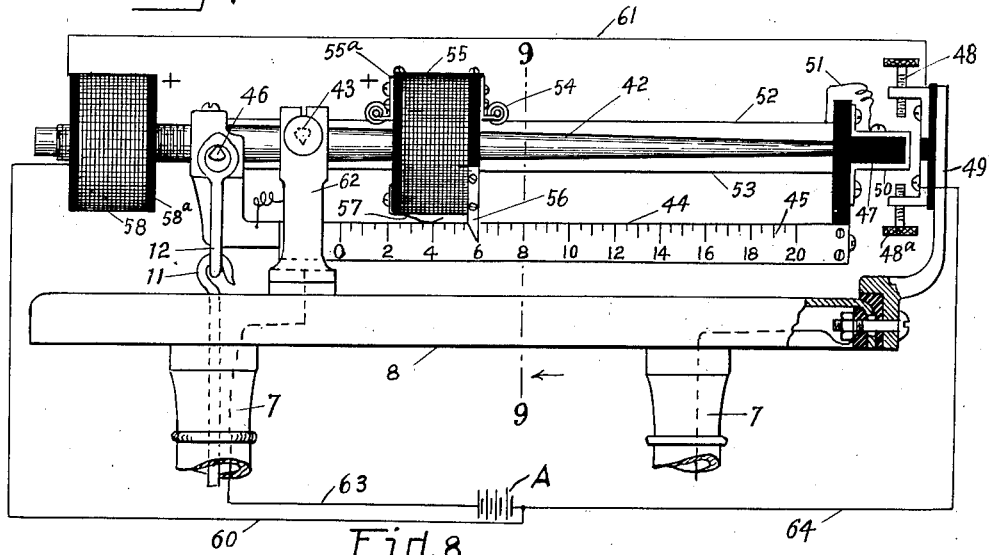
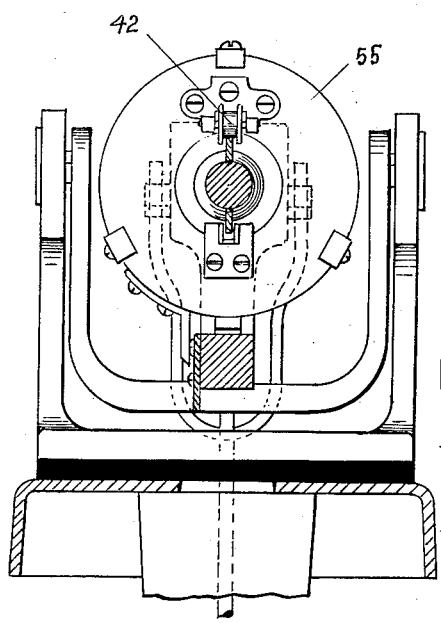
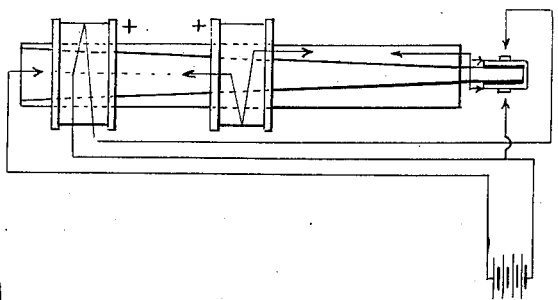

UNITED STATES PATENT OFFICE.

SAMUEL G. CRANE, OF TOLEDO, OHIO, ASSIGNOR TO TOLEDO SCALE COMPANY, OF TOLEDO, OHIO, A CORPORATION OF OHIO.

AUTOMATIC WEIGHING-SCALE.

1,328,319.　　　　　Specification of Letters Patent.　　Patented Jan. 20, 1920.

Application filed March 4, 1915. Serial No. 11,965.

*To all whom it may concern:*

Be it known that I, SAMUEL G. CRANE, a citizen of the United States, residing at Toledo, in the county of Lucas and State of Ohio, have invented new and useful Improvements in Automatic Weighing-Scales, of which the following is a specification.

This invention relates to automatic weighing scales, and more particularly to that class of beam scales in which a poise for counter-balancing or offsetting the load upon the scale platform is automatically moved along the beam until equilibrium is established.

The primary object of this invention is to provide an automatic scale with electrically-operated poise mechanism whereby the weight of an article or articles placed on the scale platform is readily and accurately indicated by the automatic movement of the poise along the scale beam.

A further object of this invention is to provide electrically-actuated automatic means to move the poise along the scale beam until the beam balances, the current to energize the automatic means being under the control of the movement of the beam.

A further object of this invention is to provide a scale in which the automatic movable poise forms a part of the electrical-actuating means.

A further object of the invention is to provide a scale employing a poise in the form of a solenoid coil automatically movable upon the scale beam and governed in its movements by electrical connections and mechanisms under the control of the movement of the beam.

With the above and other objects in view which will more readily appear after the invention is better understood, this invention consists in the novel construction, combination, and arrangement of parts to be hereinafter more fully described and particularly pointed out in the subjoined claims.

Reference is to be had to the accompanying drawings, illustrating preferred embodiments of my invention by way of exemplification, and wherein similar reference numerals designate similar parts throughout the several views.

In the drawings:—

Fig. 3 is a plan view of the beam and associated mechanism shown in Fig. 1.

Fig. 4 is a detail elevation of a modified form of side beam that may be employed in the embodiment shown in Fig. 1.

Fig. 5 is a transverse section taken substantially on the line 5—5 of Fig. 3.

Fig. 6 is a similar transverse section taken through a scale beam similar to that shown in Fig. 3 but using the form of side beams shown in Fig. 4, the side beams being cut substantially on the line 6—6 of Fig. 4.

Fig. 7 is a front elevation of the beam and associated elements of a scale employing another embodiment of my invention.

Fig. 8 is a detail plan view of a portion of the beam shown in Fig. 7.

Fig. 9 is a transverse section taken substantially on the line 9—9 of Fig. 7.

Fig. 10 is a diagrammatic view of the electric wiring system utilized in the modification shown in Fig. 7.

Figure 1:
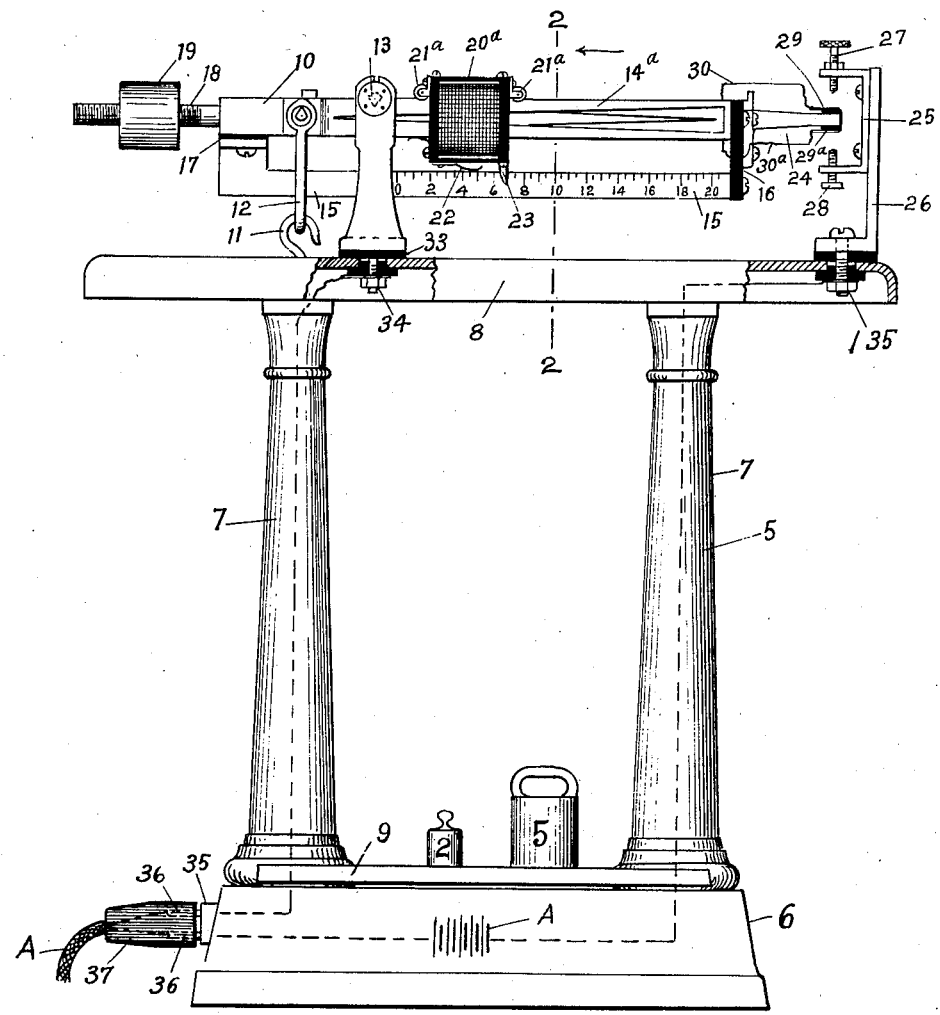
Figure 1 is a front elevation with portions broken away of a scale embodying my invention, the scale being shown with a load upon the platform and the beam in a balanced position.

The embodiment of my invention shown in Figs. 1-3 inclusive will now be described.

The reference numeral 5 designates the framework of the scale, which, as herein shown, comprises a base 6 having a pair of columns 7 adjacent the rear extremity thereof and connected at their upper extremity by a crossbar 8. The base 6 is adapted to inclose the platform levers (not shown) supporting the platform 9 of the scale, and connections are made for rocking the beam 10 from the platform levers whenever a load is placed upon the platform 9 through the hook-rod 11 and the U-shaped yoke 12 substantially as shown in Fig. 1.

The base of the scale may also inclose the batteries A, dry cells, or any similar source of electric current to energize the electric mechanisms employed in connection with this scale, as will hereinafter be described, though connection with other sources of current may also be made through the plug 35 if so desired, in which case the batteries A are not required and may be eliminated.

The beam 10 as herein shown comprises a pair of parallel side beams 14 and 14$^a$ and a lower rod or arm 15 arranged substantially centrally of the side beams 14 and 14ª and connected to, though insulated from, the side beams. As shown in Figs. 1 and 3, the opposite ends of the side beams 14 and 14ª are connected by blocks 16 and 17 of insulating material, and the lower arm 15 is suitably connected as by means of screws to these insulating blocks. The beam 10 is fulcrumed intermediate its ends as at 13 upon the bracket 32 carried by the crossbar 8 of the scale, a U-shaped supporting member 31 being secured to the lower central rod 15 and extending upwardly, carrying knife-edge pivots adjacent its upper extremities co-acting with bearings carried by the bracket 32. The bracket 32 is insulated from the crossbar 8 of the scale by the insulating block 33.

Extending rearwardly from the beam 10 adjacent the block 17 is a threaded member 18 adapted to receive the sealing weight 19 for adjustment relatively to the fulcrum of the beam in the usual manner. The poise adapted to be automatically moved relatively to the scale beam comprises a pair of solenoids 20 and 20ª connected to each other for simultaneous movement and arranged to surround the side beams 14 and 14ª respectively, the solenoids being carried upon suitable antifriction rollers 21 and 21ª resting upon the upper surfaces of the beams 14 and 14ª, which also serve as current conducting mediums as hereinafter described. One extremity of the wires forming each of the solenoid coils is connected, as shown in diagram in Fig. 5, to the metallic brush 22 contacting the upper surface of the lower arm 15 of the beam, which forms a common conducting medium, the opposite end of the wires connecting respectively with binding posts carried by the brackets supporting the anti-friction rollers 21 and 21ª, see Fig. 5. The forward surface of the arm 15 is suitably graduated to serve as an indicating means for indicating the weights of articles placed upon the scale platform in connection with a pointer or index 23 depending from the lower portion of the poise, as clearly shown in Fig. 1.

Secured to the insulating block 16 and projecting from the beam in alinement with the side beams 14 and 14ª is a nose 24 which extends within the loop 25 supported by the bracket 26 secured to the crossbar 8 of the framework of the scale. Adjustably mounted in the opposite arms of the loop 25 are upper and lower contact screws 27 and 28 respectively, which contact screws are arranged in the path of movement of the nose 24 of the scale beam as the beam oscillates in its load-offsetting movement.

Each of the side beams 14 and 14ª shown in Fig. 1 is composed of soft iron or similar magnetic material and is provided with a tapered slot substantially as shown, a tapered cut-out portion being removed from the side beams so as to distribute the mass of the metal irregularly with relation to the length of the beam, the taper being arranged and proportioned with an air gap of varying area created between the upper and lower portions of the beams where traversed by the solenoid 20 and 20ª. These tapered cut-outs in the side beams 14 and 14ª are oppositely arranged so that the center of mass of one of the side beams 14 will be in a vertical plane adjacent the opposite end of the beam from the center of mass of the other side beam 14ª.

The principle upon which the operation of this scale depends is that whenever an electric solenoid coil is energized it will attract a movable core (or be attracted by a fixed core if the solenoid is movable) and the core and solenoid will be moved relatively to each other until the center of mass of the core and solenoid coincide. By making the side beams 14 and 14ª of magnetic material so as to form substantially a core for the solenoids 20 and 20ª these solenoids connected together to act as a single poise will move along the scale beam in a forward or reverse direction according to which one of the solenoids is energized.

In the operation of the scale, the solenoid 20 when suitably energized will, according to the well-known action of solenoids with relation to their cores, be drawn toward the center of mass of the soft iron beam 14, which here operates as the core of the solenoid 20, and the solenoid 20ª when energized will be suitably drawn toward the center of mass of the side beam 14ª, which as above stated is adjacent the opposite end of the beam from the center of mass of the side beam 14. It will be apparent, therefore, that to secure a movement of the poise in one direction the solenoid coil 20 must be energized, while to secure a movement of the poise in the opposite direction the other solenoid 20ª must be energized. Thus in a scale assembled as shown in Fig. 1, to secure an advance movement of the poise, i. e., away from the fulcrum of the beam, the solenoid 20 surrounding the side beam 14, whose center of mass is farthest removed from the fulcrum, will be energized, and when the reverse movement, or movement toward the fulcrum of the beam, is desired, the solenoid 20ª surrounding the other side beam 14ª will be energized, the center of mass of this side beam 14ª being adjacent the fulcrum point 13.

Assuming now that the scale is in its normal position and the index or pointer 23 of the poise registers with the zero graduation on the beam 15, when an article is placed upon the scale platform the beam 10 would be rocked upwardly and connections made whereby the solenoid 20 will be energized so as to move the poise away from the fulcrum 13 of the beam, the solenoid poise moving toward the center of mass of the side beam 14 which has its tapered cut-out portion so arranged that the center of mass of this side beam is adjacent the free end of the scale or away from the fulcrum of the beam.

The circuits whereby the solenoid 20 will be energized to accomplish this forward movement as above described is as follows: The beam 10 being rocked upon the imposition of a load upon the scale platform, the nose 24 of the beam will be moved upwardly so that the contact piece 29 thereon engages the upper contact screw 27, said contact piece 29 being electrically connected as by the wire 30 with the side beam 14, the circuit continuing through the side beam 14 to the anti-friction roller 21, thence through the solenoid coil 20 and out through the brush 22, the lower or central rod 15, the U-shaped supporting member 31 and supporting bracket 32 which is insulated from the framework of the scale by means of the insulating block 33. One of the supporting screws 34 securing the bracket 32 in position and spaced from the framework of the scale by suitable insulating collars (see Fig. 1) is now utilized as a conducting medium, a wire leading therefrom to the source of current, which in the present instance consists of batteries A inclosed within the base 6 of the scale, the circuit being completed by a wire extending from these batteries to a suitable conducting screw 35 insulated from the framework of the scale and connecting with the bracket 26 supporting the U-shaped loop 25 carrying the contact screw 27.

The completion of the circuit by the engagement of the screw 27 by the contact piece 29 as above described energizes the solenoid 20 which moves away from the fulcrum 13 of the scale until it approaches a counter-balancing position on the scale beam whereupon the beam falls and the contact piece 29 is moved away from the contact screw 27, breaking the circuit and deenergizing the poise. If, however, the momentum of the poise carries it beyond the counter-balancing point the beam will continue to fall until the contact piece 29$^a$ on the lower surface of the nose 24 of the beam will engage the lower contact screw 28 carried by the loop 25, a circuit then being completed whereby the other solenoid 21$^a$ is energized to move the poise rearwardly to again approach the counter-balancing point. This circuit includes the contact piece 29$^a$, the wire 30$^a$ leading from the contact piece 29$^a$ to the side beam 14$^a$, the anti-friction roller 21$^a$, the opposite solenoid 20$^a$ surrounding the side beam 14$^a$, the brush 22 and the lower or central rod 15, the remainder of the circuit being substantially the same as the circuit formed when the upper contact piece 29 is in contact with the upper contact screw 27, and described in connection with that circuit. Since the center of mass of the side seam 14$^a$ is adjacent the fulcrum point of the beam the energization of the solenoid 20$^a$ as above described tends to move the poise rearwardly or toward the fulcrum point 13. As the poise approaches the counter-balancing point the beam rises, separating the contact piece 29$^a$ and the contact screw 28 and breaking the circuit. Should it happen that the momentum of the poise again carried it beyond the counter-balancing point the beam in rising will again bring the contact piece 29 into engagement with the upper contact screw 27, again closing the circuit for advancing the poise, this alternate advance and recession of the poise continuing until the exact point of equilibrium is reached.

As soon as the load is removed from the platform of the scale the beam will fall closing the circuit through the lower contact screw 28 and the side beam 14$^a$ and returning the poise to its normal or original position wherein the beam 10 is balanced so that neither of the contact screws 27 or 28 is engaged by the nose 24 of the beam.

If it is desired to avoid the use of batteries, dry cells, etc., within the base of the scale, means may be employed for conducting the current from any desired source, the plug 35 with the prongs 36 being shown herein for connection with a service plug, or the like. When, however, the batteries A are to be employed a jumper should be employed to close the circuit through the prongs 36.

Instead of the side beams 14 and 14$^a$ with the air-gap between their upper and lower portions due to the tapered cut-out in said side beams, side beams 40 and 40$^a$ such as are shown in Figs. 4 and 6 may be employed. In this embodiment the air-gap is replaced by a tapered filling 41 of brass or other non-magnetic material. In all other respects the modification shown in Figs. 4 and 6 may be the same as that shown in Figs. 1–3.

In the modification shown in Figs. 7–10, a single beam 42 pivoted intermediate its ends and formed of soft iron or like magnetic material is utilized as the scale beam, this beam being tapered substantially as shown so that its center of mass will be adjacent its pivot point 43. Suitably connected with but insulated from, the tapered beam 42 is a lower rod or arm 44 on the forward face of which is marked suitable weight graduations 45 arranged to co-act with the pointer or index 56 depending from the poise 55.

Any suitable platform and platform lever mechanism may be employed in this embodiment of my invention and a framework the same as or similar to that shown in Fig. 1 is designed to be used therewith, only the upper portion of the columns 7 and the crossbar 8 being shown in Fig. 7. The hookrod 11 and the U-shaped yoke 12 may be connected with the knife-edge pivots 46 carried by the tapered beam 42 at substantially the point shown, so that upon the imposition of a load on the scale platform the nose 47 of the scale beam will be moved upwardly to engage the upper contact screw 48 suitably supported upon, but insulated from, the bracket 49 carried by the crossbar 8 of the scale. A U-shaped contact piece 50 is secured upon the nose 47 of the beam and connections are made, as by means of the wire 51, with the tapered conducting rod 52 which is suitably secured to the upper portion of the tapered beam 42, but is insulated therefrom. The preferred construction for securing the rod 52 is to embed the lower edge of the rod in a filler of insulating material secured in a slot in the beam 42. A tapered web 53 may also be formed on or secured in any desired manner to the lower surface of the tapered beam 42 and so arranged with relation to the tapered rod 52 and the beam that the upper and lower surfaces of the movable scale beam may be substantially parallel, thereby enabling the utilization of anti-friction rollers 54 contacting the upper and lower beam faces if desired, though as herein shown, only upper rollers may be employed. In this embodiment of the scale the poise comprises a single movable solenoid 55 arranged to surround the tapered beam 42 and carrying a pointer or index 56 at its lower extremity adapted to act in conjunction with the graduations upon the lower rod 44 in indicating weights.

The anti-friction rollers 54 and the brush 57 contacting with the upper surface of the lower rod 44 serve to transmit the electric current to and from the solenoid coil 55, the current always passing through the solenoid in the same direction so as to always create the same pole, as, for example, the positive pole, adjacent the surface 55$^a$ of the solenoid which surface is closest to the surface 58$^a$ of the fixed solenoid 58 for a purpose presently to be described. The fixed solenoid 58 is secured upon the heavier extremity of the tapered beam 42, (see Fig. 7) being adjustable thereon so that it may be moved toward or away from the fulcrum of the beam to act as a sealing weight. This solenoid is wired and arranged so that when energized a positive pole, or a pole similar to that set up adjacent the surface 55$^a$ of the traveling solenoid 55 will be set up adjacent its forward surface 58$^a$, which surface is closest to the surface 55$^a$ of the movable solenoid 55.

In the operation of this embodiment of my invention, when the scale beam 42 is rocked upon the imposition of a load, the contact-piece 50 engages the upper contact screw 48, a circuit is closed whereby both the fixed solenoid 58 and the traveling solenoid 55 are energized and the like poles at their adjacent surfaces 58$^a$ and 55$^a$ respectively act to repel the traveling solenoid 55 away from the fixed solenoid 58, thereby advancing the traveling solenoid or poise along the tapered beam 42. This advance movement continues until the poise approaches a counter-balancing position on the beam, whereupon the nose of the beam falls, separating the contact-piece 50 and the contact screw 48 and breaking the circuit. The circuit for energizing the fixed and movable solenoids upon contact of the screw 48 with the contact-piece 50 is as follows: from the batteries A or other desired source of current by the wire 60 to the fixed solenoid 58, through this solenoid, and thence by the wire 61 to the upper contact screw 48, thence through the contact-piece 50, the wire 51 and the tapered conducting bar 52 to the anti-friction roller 54 of the traveling solenoid 55, thence through the solenoid 55 and the brush 57 to the lower rod 44, from which return is made through the bracket 62 and the wire 63 to the batteries.

Figure 2:
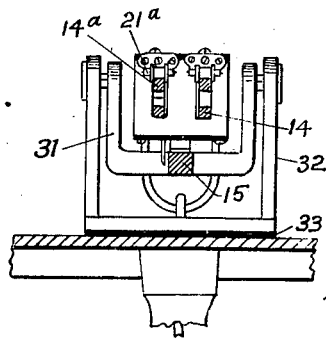
Fig. 2 is a detail transverse section on the line 2—2 of Fig. 1.

Should the advance movement of the poise carry the same beyond the counter-balancing point the beam will fall so that the contact-piece 50 will engage the lower contact screw 48$^a$ carried by the bracket 49 and a second circuit will be completed wherein the fixed magnet 58 is not included, and the traveling solenoid 55 will alone be energized, being returned toward the counter-balancing point in substantially the same manner employed to secure the movement of the solenoid poise employed in the modification shown in Figs. 1–3.

The circuit for accomplishing this return movement of the poise is as follows: from the batteries A by way of the wire 64 to the lower contact screw 48$^a$, thence through the contact piece 50, the wire 51 and the tapered bar 52 to the anti-friction rollers 54 thence through the traveling solenoid 55, the brush 57 and the lower rod 44, the remainder of the circuit being substantially the same as that employed in advancing the poise as above described.

The closing of this circuit by the engagement of the contact-piece 50 with the lower contact screw 48$^a$ energizes the solenoid 55 and it will be attracted toward or to the center of mass of the tapered beam 42, which center of mass, as above stated, is adjacent the fulcrum point 43 of the beam. As soon, however, as the poise approaches the counter-balancing point, the beam rises and the circuit is broken enabling the poise to come to rest closely adjacent the counter-balancing position on the beam. Should the momentum of the poise carry it beyond the counter-balancing position, the beam will rise and again complete the circuit through the fixed and movable solenoids and the movable poise will again be advanced, substantially as above described, and this alternate advance and recession will be continued until the counter-balancing point on the beam is attained.

As soon as the load is removed from the platform of the scale the beam will fall closing the circuit through the lower contact screw 48ª and contact piece 50, energizing only the movable solenoid 55 and returning the poise to its normal or original position wherein the beam 42 is balanced so that neither of the contact screws 48 or 48ª are engaged by the contact piece 50 on the nose of the beam.

From the above it will be apparent that the principle whereby the attraction of a solenoid and its core moves the two relatively to each other until their centers of mass coincide is utilized in both of the embodiments of my scale herein disclosed. However, other means for moving the solenoid relatively to its core can also be employed in the utilization of my scale, as, for example, the repulsion of the movable solenoid from the fixed solenoid in the modification shown in Figs. 7–10 inclusive.

It is to be understood, however, that many variations and modifications of my invention are possible, any electrical devices or mechanisms whereby a poise forming a conducting part of the electrical mechanisms is moved relatively to a beam which likewise has portions thereof formed as conducting parts of the electric devices being embraced within the spirit and scope of my invention as set forth in the subjoined claims.

Having described my invention, I claim:

1. In an automatic electric scale, a beam formed of magnetic material of varying cross-sectional area, a poise having a solenoid coil embracing the beam and movable relatively to the beam when energized, and means for energizing said solenoid coil.

2. In an automatic electric scale, a beam formed of magnetic material of varying cross-sectional area, a poise having a solenoid coil embracing the beam and movable relatively to the beam when energized, and means controlled by the beam for energizing said solenoid coil upon the imposition of a load.

3. In an automatic electric scale, a beam formed of magnetic material of varying cross-sectional area, a poise having a solenoid coil embracing the beam and movable relatively to the beam when energized, and electrical connections and mechanisms for energizing said solenoid coil upon the imposition of a load, the current when said connections are closed traversing the coil and portion of the beam.

4. In an automatic electric scale, a beam formed of magnetic material of varying cross-sectional area, a poise having a solenoid coil embracing the beam and movable relatively to the beam when energized, and means for energizing said coil including an electric circuit of which the beam and coil form a part.

5. In an electric scale, a scale beam having a portion thereof of magnetic material of varying cross-sectional area, and a portion bearing weight graduations thereon arranged adjacent the magnetic portion of the scale beam, a poise having a solenoid arranged to surround the magnetic portion of the beam, said poise having a part to coöperate with the graduated portion thereof in indicating weights, and electrical means for energizing said solenoid for moving said poise relatively to the scale beam.

6. In an electric scale, a scale beam having a portion thereof of magnetic material of varying cross-sectional area, and a portion bearing weight graduations thereon arranged adjacent the magnetic portion of the scale beam, a poise having a solenoid coil arranged to surround the magnetic portion of the beam, said poise having a part to coöperate with the graduated portion thereof in indicating weights, and electrical means for energizing said coil for moving said poise relatively to the scale beam, including a circuit of which the beam and coil form a part.

7. In an electric scale, a scale beam formed of sections of magnetic material insulated from each other, a poise including a solenoid coil movable relatively thereto, electrical contact pieces carried by the scale beam, contact screws carried by the framework of the scale in contiguity to the contact pieces of the scale beam, and electrical connections and mechanisms arranged to move said poise upon the engagement of the said contact devices of the beam with said contact screws.

8. In an electric scale, a scale beam including parallel sections of magnetic material of varying cross-sectional area insulated from each other, said sections being arranged so that their centers of mass are in parallel vertical planes unequally spaced from the beam fulcrum.

9. In an electric scale, a scale beam having separated side portions having tapered cut-out portions therein, and arranged so that their centers of mass will be disposed in parallel vertical planes, unequally spaced from the beam fulcrum, and a poise having a solenoid coil surrounding each of said side portions.

10. In an electric scale, a scale beam pivoted intermediate its ends and comprising a pair of separated side beams of magnetic material of varying cross-sectional area insulated from each other, a poise having a pair of solenoid coils connected together and respectively arranged to surround the magnetic side beams of said scale beam, and electrical connections and mechanisms for energizing the poise under the control of the scale beam.

11. In an electric scale, a scale beam pivoted intermediate its ends and comprising a pair of separated side beams of magnetic material of varying cross-sectional area insulated from each other, a poise having a pair of solenoid coils connected together and respectively arranged to surround the magnetic side beams of said scale beam, and electrical connections and mechanisms for energizing the poise under the control of the scale beam including a pair of contact pieces carried by the scale beam and connected respectively with said side beams and contact members arranged in the path of movement of said contact pieces.

12. In an electric scale, a scale beam pivoted intermediate its ends and comprising a pair of separated side beams of magnetic material having tapered cut-out portions therein, the taper in one of the side beams extending in the opposite direction from the taper in the other side beam, a poise having a pair of solenoid coils connected together and respectively arranged to surround the magnetic side beams of said scale beam, and electrical connections and mechanisms for energizing the poise under the control of the scale beam.

13. In an electric scale, a scale beam pivoted intermediate its ends and comprising a pair of separated side beams of magnetic material having tapered cut-out portions therein, the taper in one of the side beams extending in the opposite direction from the taper in the other side beam, a poise having a pair of solenoid coils connected together and respectively arranged to surround the magnetic side beams of said scale beam, and electrical connections and mechanisms for energizing the poise under the control of the scale beam including a pair of contact pieces carried by the scale beam and connected respectively with said side beams and contact members arranged in the path of movement of said contact pieces.

14. In an electric scale, a scale beam comprising a pair of separated side beams of magnetic material of varying cross-sectional area and a central rod having weight graduations thereon, a poise having solenoid coils respectively surrounding said side beams, said poise carrying a pointer arranged to move over the graduations on the central rod, and means for energizing the poise upon the imposition of a load.

15. In an electric scale, a scale beam pivoted intermediate its ends and formed of magnetic material disposed with its center of mass adjacent the pivot point, a poise having a solenoid coil movable along the beam on one side of the pivot point, and electrical connections and mechanisms for energizing said solenoid coil to move the same toward the center of mass of the scale beam.

16. In an electric scale, a fulcrumed scale beam having a pair of side beams formed of magnetic material of varying cross-sectional area, one of said beams being disposed so that its center of mass is adjacent the fulcrum of the beam, and the other of said side beams being disposed so that its center of mass is spaced from the beam fulcrum, a poise having solenoid coils respectively surrounding said side beams, and means for energizing said poise to move same toward or away from the beam fulcrum.

17. In an electric scale, a fulcrumed scale beam having a pair of side beams formed of magnetic material of varying cross-sectional area, one of said beams being disposed so that its center of mass is adjacent the fulcrum of the beam, and the other of said side beams being disposed so that its center of mass is spaced from the beam fulcrum, a poise having solenoid coils respectively surrounding said side beams, and means for energizing one or the other of said coils to move the poise toward or away from the beam fulcrum.

18. In an automatic electric scale, a beam formed of magnetic material, the magnetic masses of which are so arranged as to form an electro-magnetic field of increasing intensity longitudinally of the beam, a poise movable longitudinally of the beam, an electric coil on the poise, and means controlled by the position of the beam for closing the circuit of the coil, whereupon is effected a movement of the poise in the direction of the greater strength of the electro-magnetic field, which movement tends to restore the equilibrium of the beam.

SAMUEL G. CRANE.

Witnesses:
H. S. Bergen,
C. Wm. Fessenden.